B. H. Goodale,
Wind Wheel,
Nº 82,307.          Patented Sep. 22, 1868.
Fig. 1.
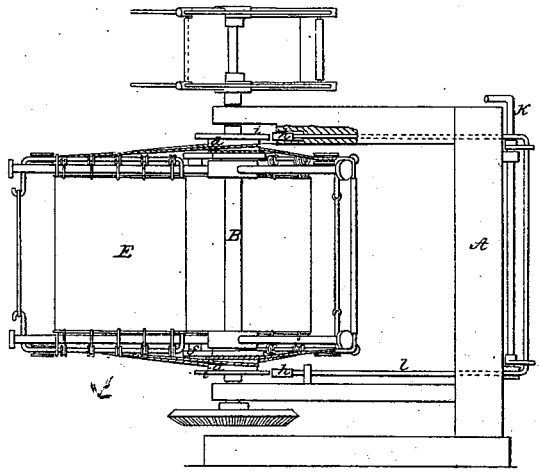
Fig. 2.
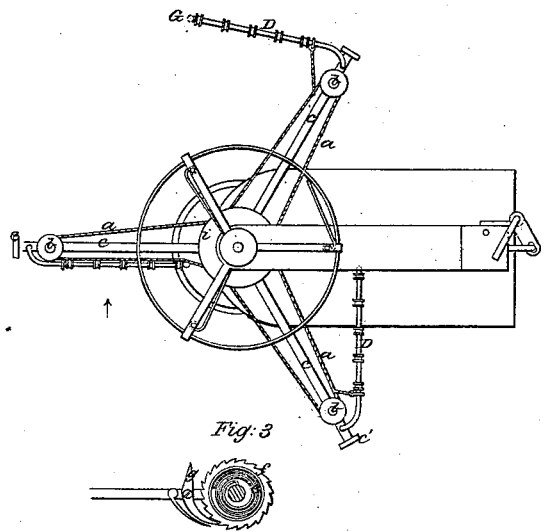
Fig. 3.
Witnesses:          Inventor:
Benj. H. Goodale
per Munn & Co.
Attorneys

United States Patent Office.

BENJAMIN H. GOODALE, OF NEWBURYPORT, MASSACHUSETTS.

Letters Patent No. 82,307, dated September 22, 1868.

IMPROVEMENT IN WIND-WHEELS.

The Schedule referred to in these Letters Patent and making part of the same.

TO ALL WHOM IT MAY CONCERN:

Be it known that I, BENJAMIN H. GOODALE, of Newburyport, in the county of Essex, and State of Massachusetts, have invented a new and useful Improvement in Wind-Wheels; and I do hereby declare that the following is a full, clear, and exact description thereof, which will enable others skilled in the art to make and use the same, reference being had to the accompanying drawings, forming part of this specification, in which—

Figure 1 represents a side elevation,
Figure 2 represents a plan view, and
Figure 3 represents a detail view.

Similar letters of reference indicate corresponding parts.

The object of this invention is to provide an improved wind-wheel of simple construction.

It consists in an arrangement whereby the sails are suspended from the outer ends of the horizontal arms of a vertical shaft, in such a manner that the action of the wind will open them when they have arrived at the position when it will have no effect on them by direct action, and thereafter operate on them by reaction for a considerable portion of the revolution.

It also consists in an arrangement of means for furling the sails, and thereby stopping the wheel or unfurling them to set it in motion.

In the drawings—

A represents a framing-wheel, on which a vertical shaft, B, is supported, which is provided with three sets of horizontal arms, C, at the outer ends of which are jointed three more sets of arms, D, so as to swing horizontally thereon, to a limited degree, in an outward direction, but so as to close against the arms C inwardly.

The disk C' on the ends of the arms C arrest the arms in their outward motion, by the bent portions thereof coming into contact with them, and prevents them from swinging too far.

The sails E are suspended by hank-rings on the said arms D, and are connected at their outer edges to cords, which work over the pulleys $b$ on the arms C, near their outer ends, and over the drums $d$ on the vertical shaft, above and below the hubs of each set of horizontal arms.

The said drums are made hollow, and work loosely on the shaft, and are connected to the end of a coiled spring enclosed within them, the other end of which is secured to the shaft. They are also provided with ratchet-wheels, in which spring-pawls, $g$, secured to the arm at each end, work.

The said springs are so connected to the said drums that they actuate them, in the direction to maintain the sails in a spread condition, through the medium of the cords $a$.

$h$ and $h$ represent friction-brakes, designed to act on the projecting rims $i\ i$ of the drums, whereby, when the wheel is in motion, the motion of the drums may be arrested, which will cause the cords $a$, which are carried around by the arms, to so wind on to the drums as to draw up the sails on the arms D in a folded condition, thereby arresting the motion of the wheel. The pawls acting upon the ratchets on the drums, will retain them in this condition until it is desired to set the wheel in motion again, when, by detaching the pawls from the ratchets, the springs $e$ will cause the drums to revolve in the direction to spread the sails so as to take the wind.

The brakes $h$ are actuated by the crank-shaft $k$, to which they are connected by the rods $l$. They may be actuated by any other suitable means.

Let the wind be supposed to be blowing in the direction of the arrow in fig. 2. When the sails come around to take the wind, they will be swung against the arms C until the latter have passed around to a point slightly beyond a line parallel with the course of the wind, when they will swing outward, as shown at G, fig. 2, in which condition they will continue until they arrive at a point where they will stand parallel with the course of the wind, when they will begin to close in again towards the arms C, and become completely closed against the said arms, as soon as the latter arrive on the windward side at the line parallel with the course of the wind, at which time they again take it.

It will thus be seen that from the time the sails will have arrived at the point where the wind ceases to act on them, they stand edgewise to the wind till they take it again, whereby but little of the power of the wind is lost while they are out of action.

It will also be observed that after the arms C have passed the line of parallelism with the course of the wind on the lee side, and the sail has swung out, the wind continues to have a propelling effect thereon by reaction until the sail arrives on the line parallel with the course of the wind; hence, by this arrangement, a dynamic effect is produced on the sails or wings for about two-thirds of the revolution.

E represents a wheel, constructed on the same plan with respect to the arrangement of the wings at the outer ends of the arms, having the wings made of thin sheet metal.

They may also be made of wood, or other suitable material, and formed of slats, which may also be arranged to fold up.

Having thus described my invention, I claim as new, and desire to secure by Letters Patent—

The combination, with the hinged wings, of means, substantially as described, for folding the sails, as and for the purpose described.

BENJAMIN H. GOODALE.

Witnesses:
    HARRISON G. JOHNSON,
    WM. F. CLEMENT.